United States Patent [19]

Dickinson

[11] Patent Number: 4,532,305

[45] Date of Patent: Jul. 30, 1985

[54] THERMOPLASTIC POLYMER PLASTICIZED WITH A POLY(ARYL ETHER)

[75] Inventor: Barry L. Dickinson, Whitehouse Station, N.J.

[73] Assignee: Union Carbide Corporation, Danbury, Conn.

[21] Appl. No.: 637,697

[22] Filed: Aug. 6, 1984

[63] Continuation-in-part of Ser. No. 393,557, Jun. 30, 1982, abandoned.

[51] Int. Cl.³ ............... C08L 69/00; C08L 71/00; C08L 79/08
[52] U.S. Cl. .................... 525/390; 524/537; 524/540; 525/392; 525/396
[58] Field of Search ............ 525/390, 392, 396; 524/537, 540

[56] References Cited

U.S. PATENT DOCUMENTS

| | | |
|---|---|---|
| 3,264,536 | 8/1966 | Robinson et al. .......... 528/174 |
| 3,471,587 | 10/1969 | Whittemore et al. .......... 525/390 |
| 3,496,236 | 2/1970 | Cooper et al. .......... 525/390 |
| 3,558,740 | 1/1971 | Behr et al. .......... 525/390 |
| 3,742,087 | 6/1973 | Nield .......... 525/437 |
| 4,108,837 | 8/1978 | Johnson et al. .......... 528/219 |
| 4,259,458 | 3/1981 | Robeson .......... 525/390 |
| 4,321,355 | 3/1982 | Maresca et al. .......... 528/302 |

*Primary Examiner*—Ronald W. Griffin
*Attorney, Agent, or Firm*—Donald M. Papuga

[57] ABSTRACT

Described herein is a plasticized thermoplastic polymer composition comprising in admixture, a thermoplastic polymer selected from a polyarylate, a polyetherimide, an aromatic polycarbonate, a poly(aryl ether) having a molecular weight in excess of 10,000 and mixtures thereof and a plasticizing amount of a poly(aryl ether) having a molecular weight of from about 1,000 to about 5,000.

11 Claims, No Drawings

THERMOPLASTIC POLYMER PLASTICIZED WITH A POLY(ARYL ETHER)

This application is a continuation Ser. No. 393,557, filing date 6.30.82 now abandoned.

BACKGROUND OF THE INVENTION

This invention is directed to a plasticized thermoplastic polymer composition comprising in admixture, a thermoplastic polymer selected from a polyarylate derived from a dihydric phenol and at least one aromatic dicarboxylic acid, a polyetherimide, an aromatic polycarbonate, a poly(aryl ether) having a molecular weight in excess of 10,000, and mixtures thereof, and a poly(aryl ether) having a molecular weight of from about 1000 to about 5,000.

Thermoplastic polymers such as polyarylates, polyetherimides, aromatic polycarbonates and poly(aryl ether)s are high temperature, high performance thermoplastic polymers with a good combination of thermal and mechanical properties.

However, these thermoplastics are generally processed at high temperatures. For example, polyarylates are generally processed at temperatures of about 680° C. At these temperatures the mechanical properties of the polymer may be detrimentally effected. Additives have been proposed which lower the processing temperature of the polymers. However, many of these polymers are not stable at these processing temperatures. Thus, there is a desire to lower the processing temperature of the polymer without effecting the mechanical properties. Also, if an additive is used to lower the processing temperature it must be compatible with and not degrade the polymer. Further, it is also desirous that the additive improve the moldability, i.e., the ability of the molten polymer to flow in a thin-walled mold.

In the present invention it has been found that low molecular weight poly(aryl ether) improves the moldability of a thermoplastic polymer in that the ability of the thermoplastic polymer melt to flow into thin-walled molds is improved and also, the processing temperature of the thermoplastic polymer is reduced.

THE INVENTION

It has now been discovered that by admixing a poly(aryl ether) having a molecular weight of from about 1000 to about 5000 with a thermoplastic polymer selected from a polyarylate derived from a dihydric phenol and at least one aromatic dicarboxylic acid, a polyetherimide, an aromatic polycarbonate or a poly(aryl ether) having a molecular weight in excess of 10,000, or mixtures thereof, the thermoplastic polymer may be processed at a lower temperature, thus retaining the high mechanical properties of the polymer. Also, the thermoplastic polymer has improved moldability in that the ability of a thermoplastic polymer melt to flow into a thin-walled mold is improved.

In the practice of this invention, the poly(aryl ethers) which may be used are linear, thermoplastic polyarylene polyether polysulfones wherein the arylene units are interspersed with ether and sulfone linkages. These resins may be obtained by reaction of an alkali metal double salt of a dihydric phenol and a dihalobenzenoid compound, either or both of which contain a sulfone or ketone linkage, i.e., $-SO_2-$ or $-CO-$ between arylene groupings, to provide sulfone or ketone units in the polymer chain in addition to arylene units and ether units. The polysulfone polymer has a basic structure comprising recurring units of the formula:

$$-O-E-O-E'-$$

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. Nos. 3,264,536, and 4,108,837, for example.

The residuum of a dihydric phenol, E is derived from dinuclear phenols having the structure:

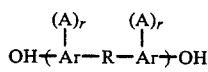

wherein Ar is an aromatic group and preferably is a phenylene group, the A's may be the same or different inert substituent groups, such as alkyl groups having from 1 to 4 carbon atoms, halogen atoms, i.e., fluorine, chlorine, bromine or iodine, or alkoxy radicals having from 1 to 4 carbon atoms, the r's are independent integers having a value of from 0 to 4, inclusive, and R is representative of a bond between aromatic carbon atoms as in dihydroxydiphenyl, or is a divalent radical, including, for example, CO, O, S, S—S, $SO_2$ or a divalent organic hydrocarbon radical, such as alkylene, alkylidene, cycloalkylene, cycloalkylidene, or the halogen, alkyl, aryl substituted alkylene, alkylidene, cycloalkylene, and cycloalkylidene radicals as well as alkarylene and aromatic radicals and a ring fused to both Ar groups.

Typical preferred poly(aryl ethers) have recurring units having the following structure:

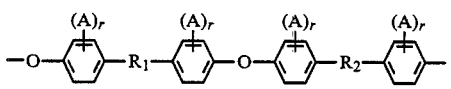

wherein A and r are as previously defined $R_1$ is representative of a bond between aromatic carbon atoms or a divalent connecting radical and $R_2$ represents sulfone, carbonyl, or sulfoxide. Preferably, $R_1$ represents a bond between aromatic carbon atoms. Even more preferred are the polysulfones of the above formula wherein the r's are zero, $R_1$ is a divalent connection radical of the formula:

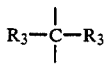

wherein $R_3$ is independently selected from lower alkyl, aryl, and the halogen substituted groups thereof, preferably methyl and $R_2$ is a sulfone group.

The poly(aryl ether) polymer has a molecular weight in excess of 10,000.

The poly(aryl ether) plasticizer has a molecular weight of from about 1000 to about 5000.

The preferred poly(aryl ether) have repeating units of the formula:

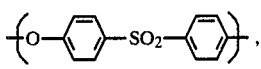

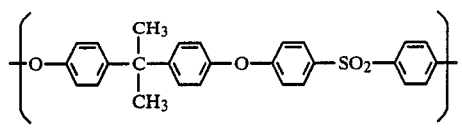

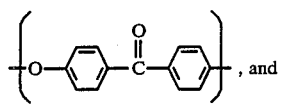

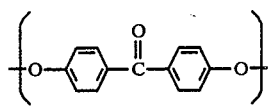

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

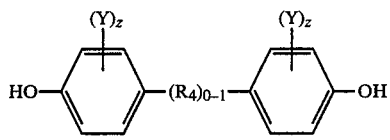

wherein Y is selected from alkyl groups of 1 to 4 carbon atoms, chlorine or bromine, each z, independently, has a value of from 0 to 4, inclusive, and $R_4$ is a divalent saturated or unsaturated aliphatic hydrocarbon radical, particularly an alkylene or alkylidene radical having from 1 to 3 carbon atoms, or a cycloalkylidene or cycloalkylene radicals having up to and including 9 carbon atoms. The preferred dihydric phenol is bisphenol-A. The dihydric phenols may be used individually or in combination.

The aromatic dicarboxylic acids that may be used in this invention inclue terephthalic acid, isophthalic acid, any of the naphthalene dicarboxylic acids and mixtures thereof, as well as alkyl substituted homologs of these carboylic acids, wherein the alkyl group contains from 1 to about 4 carbon atoms, and acids containing other inert substituents, such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

Preferably, the polyarylates used in this invention are prepared by the process described in U.S. patent application Ser. No. 189,561, filed Sept. 23, 1980, in the names of L. M. Maresca, et al. now U.S. Pat. No. 4,321,355 issued Mar. 23, 1982 and titled "Improved Process For Preparing Polyarylates". This application describes an improved process for preparing a polyarylate having a reduced viscosity of from about 0.5 to greater than 1.0 dl/gm which process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride, after formation of the dihydric phenol diester, so that its concentration is less than about 1500 parts per million.

The polyetherimides suitable for use in this invention are well known in the art and are described in, for example, U.S. Pat. Nos. 3,847,867, 3,838,097 and 4,107,147.

The polyetherimides are of the following formula:

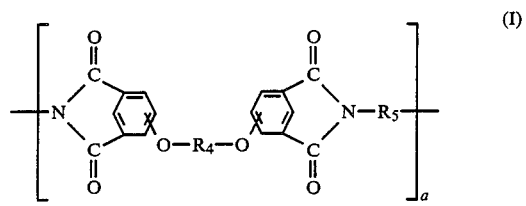

wherein a is an integer greater than 1, preferably from about 10 to about 10,000 or more, —O—$R_4$—O— is attached to the 3 or 4 and 3' or 4' positions and $R_4$ is selected from (a) a substituted or unsubstituted aromatic radical such as

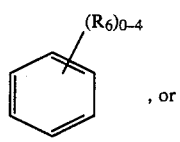, or

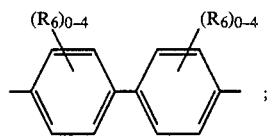;

(b) a divalent radical of the formula:

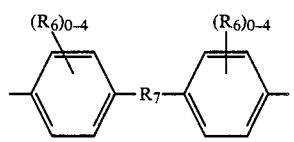

wherein $R_6$ is independently $C_1$ to $C_6$ alkyl, or halogen and $R_7$ is selected from

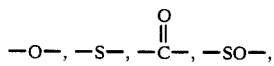

alkylene of 1 to 6 carbon atoms, cycloalkylene of 4 to 8 carbon atoms, alkylidene of 1 to 6 carbon atoms or cycloalkylidene of 4 to 8 carbon atoms, $R_3$ is selected from an aromatic hydrocarbon radical having from 6–20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms, $C_2$-$C_8$ alkylene terminated polydiorganosiloxane and a divalent radical of the formula

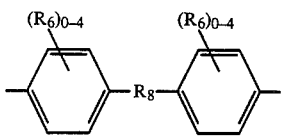

wherein $R_6$ are as previously defined, and $R_8$ may be a direct bond.

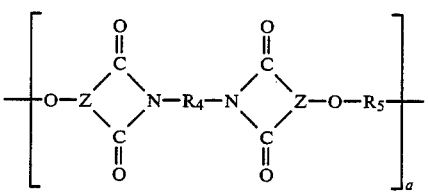

wherein —O—Z is a member selected from

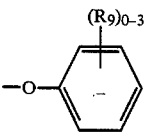 (a)

wherein $R_9$ is independently hydrogen, lower alkyl or lower alkoxy

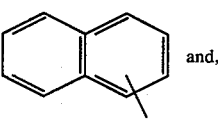 (b)

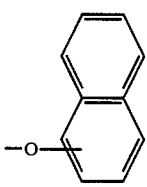 (c)

wherein the oxygen may be attached to either ring and located ortho or para to one of the bonds of the imide carbonyl groups, $R_4$ and $R_5$ and a are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (I) can, for example, be obtained by any of the methods well-known to those skilled in the art including the reaction of any aromatic bis(ether anhydride)s of the formula

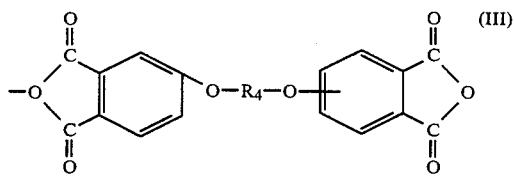 (III)

where $R_4$ is as defined hereinbefore, with a diamino compound of the formula

 (IV)

where $R_3$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° to about 250° C. Alternatively, the polyetherimides can be prepared by melt polymerization of any dianhydride of Formula III with any diamino compound of Formula IV while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides of Formula I have an intrinsic viscosity [n] greater than 0.2 deciliters per gram, preferably 0.35 to 0.60, or 0.7 deciliters per gram or even higher when measured in m-cresol at 25° C.

The aromatic bis(ether anhydride)s of Formula III include, for example,
2,2-bis[4-(2,3-dicarboxyphenoxy)phenyl]propane dianhydride;
4,4′-bis(2,3-dicarboxyphenoxy)diphenyl ether dianhydride;
1,3-bis(2,3-dicarboxyphenoxy)benzene dianhydride;
4,4′-bis(2,3-dicarboxyphenoxy)diphenyl sulfide dianhydride;
1,4-bis(2,3-dicarboxyphenoxy)benzene dianhydride;
4,4′-bis(2,3-dicarboxyphenoxy)benzophenone dianhydride;
4,4′-bis(2,3-dicarboxyphenoxy)diphenyl sulfone dianhydride;
2,2-bis[4-(3,4-dicarboxyphenoxy)phenyl]propane dianhydride;
4,4′-bis(3,4-dicarboxyphenoxy)diphenyl ether dianhydride;
4,4′-bis(3,4-dicarboxyphenoxy)diphenyl sulfide dianhydride;
1,3-bis(3,4-dicarboxyphenoxy)benzene dianhydride;

1,4-bis(3,4-dicarboxyphenoxy)benzene dianhydride;
4,4'-bis(3,4-dicarboxyphenoxy)benzophenone dianhydride;
4-2,3-dicarboxyphenoxy)-4'-(3,4-dicarboxyphenoxy)diphenyll-2,2-propane dianhydride; etc. and mixtures of such dianhydrides.

The organic diamines of Formula IV include, for example, m-phenylenediamine, p-phenylenediamine, 4,4'-diaminodiphenylpropane, 4,4'-diaminodiphenylmethane, benzide, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, The polyetherimides of formula (II) may, for example, be prepared by effecting reaction in the presence of a dipolar aprotic solvent of a mixture of ingredients comprising, for instance, (1) a bis(nitrophthalimide) od the general formula:

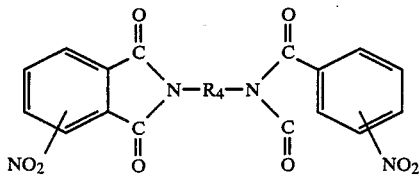
(V)

wherein R$_4$ is defined as hereinabove, and (2) an alkali metal salt of an organic compound of the general formula:

$$MO-R_5-OH \quad (VI)$$

wherein M is an alkali metal and R$_5$ is defined as hereinabove.

The bis(nitrophthalimide) used in preparing the polymer is formed by reacting a diamine of the formula described above, NH$_2$—R$_5$—NH$_2$, with a nitro-substituted aromatic anhydride of the formula:

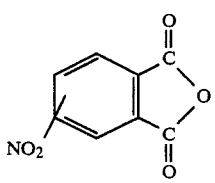
(VII)

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalenedicarboxylic anhydride and 3-methoxy-6-nitrophthalic anhydride, and the like.

With reference to the alkali metal salts of formula VI among the divalent carbocyclic aromatic radicals which R$_2$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g. hydroquinone, resorcinol, chlorohydroquinone, etc. In addition, R$_2$ may be a residue of a dihydroxy diarylene compound in which the aryl nuclei are joined by either an aliphatic group, a sulfoxide group, sulfonyl group, sulfur, carbonyl group, oxygen, the —OC(CH$_3$)(CH$_2$)$_2$(COOH) group, etc. Typical of such diarylene compounds are the following:

2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
hydroquinine;
naphthalene diols;
bis(4-hydroxyphenyl)ether;
bis(4-hydroxyphenyl)sulfide;
bis(4-hydroxyphenyl)sulfone; and the like.

When dialkali metal salts of formula VI are used with the compound illustrated by formula V, the ingredients are advantageously present in an equal molar ratio for optimum molecular weight and properties of the polymer. Slight molar excesses, e.g., about 0.001 to 0.10 molar excess of either the dinitro-substituted organic compound or of the dialkali metal salt of formula may be employed. When the molar ratios are approximately equal, the polymer is substantially terminated by a=-Z—NO$_2$ at one end and a phenolic group at the other end. If there is a molar excess of one compound, that particular terminal group will predominate.

The conditions of reaction whereby the alkali-metal salt of formula IV is reacted with the dinitro-substituted organic compound of formula III can be varied widely. Generally, temperatures of the order of about 25°-150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed as precipitants for this purpose.

It is important that the reaction between the dinitro-substituted organic compound of formula III and the alkali-metal salt of formula IV (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10-20% by weight of polymer is preferably employed.

The preferred polyetherimides include those of the formula:

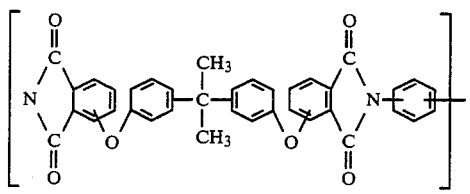

The thermoplastic aromatic polycarbonates that can be employed herein are homopolymers and copolymers and mixtures thereof which have an intrinsic viscosity of 0.40 to 1.0 dl/g as measured in methylene chloride at 25° C. and are prepared by reacting a dihydric phenol with a carbonate precursor. Typical of some of the dihydric phenols that may be employed in the practice of this invention are bisphenol-A i.e., [2,2-bis(4-hydroxyphenyl)propane], bis(4-hydroyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or inter-polymer rather than a homopolymer is desired for use in the preparation of the aromatic carbonate polymers of this invention.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl)carbonate, di-(bromophenyl)carbonate, di-(trichlorophenyl)carbonate, di-(tribromophenyl)carbonate, etc., di-(alkylphenyl)carbonates such as di(tolyl)carbonate, etc., di-(naphthyl)carbonate, di-(chloronaphthyl)carbonate, phenyl tolyl carbonate, chlorophenyl chloronaphthyl carbonate, etc. or mixtures thereof. The haloformates of dihydric phenols for example, bischloroformates of bisphenol-A, of hydroquinone, etc.) or glycols (for examples, bishaloformates of ethylene glycol, neopentyl glycol, polyethylene glycol, etc.). While other carbonate precursors will occur to those skilled in the art, carbonyl chloride, also known as phosgene, is preferred.

The aromatic carbonate polymers of this invention may be prepared by using phosgene or a haloformate and by employing a molecular weight regulator, an acid acceptor and a catalyst. The molecular weight regulators which can be employed in carrying out the process of this invention include monohydric phenols such as phenol, para-tertiarybutylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetra-methylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonates can be prepared in a one-phase (homogeneous solution) or two-phase (interfacial) systems when phosgene or a haloformate are used. Bulk reactions are possible with the diarylcarbonate precursors.

The poly(aryl ether) is used in plasticizing amounts of from about 0.5 to about 10 and preferably from about 2 to about 6 weight percent.

Other additives may be included in the composition of this invention. These additives include pigments, reinforcing agents, such as glass fibers; thermal stabilizers; ultraviolet light stabilizers, impact modifiers of one or more thermoplastic polymers, and the like.

The compositions are prepared by blending the thermoplastic polymer, poly(aryl ether) and any other optional ingredients by any conventional mixing methods. For example, the thermoplastic polymer and poly(aryl ether) are mixed in powder or granular form in an extruder and extruding the mixture into strands, chopping the strands into pellets and molding the pellets into the desired article.

EXAMPLES

The following examples serve to give specific illustrations of the practice of this invention but they are not intended in any way to limit the scope of this invention. In these examples, all parts and percentages are on a weight basis unless otherwise specified.

In the Examples the following designations are used:
A poly(aryl ether) having repeat units of the formula:

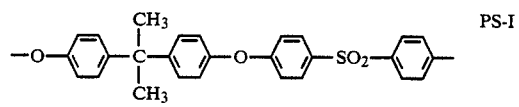

PS-I having a molecular weight of 2600 and a reduced viscosity of 0.15 as measured in chloroform at 25° C.

PS-II Same strucutre as PS-I but having a molecular weight of 4700 and a reduced viscosity of 0.22 as measured in chloroform at 25° C.

PS-III Same structure as PS-I but having a molecular weight of 8000 and a reduced viscosity of 0.27 as measured in chloroform 25° C.

PS-IV Same structure as PS-I but having a molecular weight of 21,000 and a reduced viscosity of 0.43 as measured in chloroform at 25° C.

CONTROL A

A polyarylate (prepared from bisphenol-A and a mixture of 50 mole percent of terephthalic acid chloride and 50 mole percent of isophthalic acid chloride by conventional methods) having a reduced viscosity of 0.66 dl/g as measured in p-chlorophenol at 49° C. was injection molded in a 3 ounce Van Dorn molding machine at the following temperatures: 690° F., 720° C. and 740° F. Injection pressure was 18,000 p.s.i. and maximum injection speed was used. The mold temperature was 280° F. A spiral flow mold was used which had a flow channel thickness of 0.080 inches.

The spiral flow mold is a long, spiral-shaped channel of constant thickness, spruegated to inject melt at the center of the spiral. The channel is of such length that an injected melt will stop flowing before the channel is filled, due to melt cooling and increasing viscosity as it moves around the spiral. Length of flow therefore indicates ease by which a melt will flow into a mold.

The polyarylate was molded into ASTM test bars at the three temperatures, i.e., 690° F., 720° F. and 740° F. The data in Table I shows the inches of flow into the spiral mold versus melt temperature. Also the transparencey of the molded bars.

The results are shown in Table I.

EXAMPLE 1

97 weight percent of the polyarylate described in Control A was tumble mixed with 3 weight percent of PS-I. The blend was injection molded and tested by the procedure described in Control A.

The results are shown in Table I.

EXAMPLE 2

97 weight percent of the polyarylate described in Control A was blended with 3 weight percent of PS-II by the procedure as described in Example 1. The blend was injection molded and tested by the procedure described in Control A.

The results are shown in Table I.

TABLE I

| Example | Ingredients (Amounts) | Spiral Flow (Inches at) | | | Transparency of Molded Part |
|---|---|---|---|---|---|
| | | 690° F. | 720° F. | 740° F. | |
| Control A | PA (100) | 6.0 | 7.3 | 8.3 | Transparent |
| Example 1 | PA (97) PS-I (3) | 8.5 | 10.3 | 11.6 | Transparent |
| Example 2 | PA (97) PS-II (3) | 6.5 | 8.25 | 9.5 | Transparent |

CONTROL B

This Control uses the same polyarylate as that of Control A except it is in the form of pellets rather than powder as in Control A.

The pellets were injected molded and tested by procedure described in Control A.

The results are shown in Table II.

EXAMPLE 3

95 weight percent of the polyarylate described in Control B was blended with 5 weight percent of PS-III by the procedure as described in Example 1. The blend was injection molded and tested by the procedure described in Control A.

The results are shown in Table II.

EXAMPLE 4

90 weight percent of the polyarylate described in Control B was blended with 10 weight percent of PS-IV by the procedure as described in Example 1. The blend was injection molded and tested by the procedure described in Control A.

The results are shown in Table II.

TABLE II

| Example | Ingredients (Amounts) | Spiral Flow (Inches at) | | | Transparency of Molded Part |
|---|---|---|---|---|---|
| | | 690° F. | 720° F. | 740° F. | |
| Control B | PA (100) | 5.5 | 6.9 | 7.8 | Transparent |
| Example 3 | PA (95) PS-I (3) | 6.8 | 8.75 | 10.0 | Light Haze |
| Example 4 | PA (90) PS-IV (10) | 6.3 | 8.0 | 9.2 | Hazy |

In the following Control B and Examples the resin and resin blends were injection molded into ASTM test bars at a low temperature and a high temperature. The low temperature was the lowest temperature where the machine could fill the mold while the high temperature was the highest temperature at which no appearance of degradation took place. The medium temperature (DT) was the difference between the high and low temperatures.

EXAMPLE 5

97 weight percent of the polyarylate described in Control B was blended with 3 weight percent of PS-I by the procedure described in Example I. The blend was injection molded and tested as described, supra.

The results are shown in Table III.

EXAMPLE 6

97.5 weight percent of the polyarylate described in Control B was blended with 2.5 weight percent of PS-III by the procedure described in Example 1. The blend was injection molded and tested as described, supra.

The results are shown in Table III.

EXAMPLE 7

95 weight percent of the polyarylate described in Control B was blended with 5 weight percent of PS-III by the procedure described in Example 1. The blend was injection molded and tested as described, supra.

The results are shown in Table III.

EXAMPLE 8

90 weight percent of the polyarylate described in Control B was blended with 10 weight percent of PS-IV by the procedure described in Example 1. The blend was injection molded and tested as describe, supra.

The results are shown in Table III.

TABLE III

| Example | Ingredients (Amounts) | Molding Temperature (°F.) High | Molding Temperature (°F.) Low | DT | Transparency of Molded Part |
|---|---|---|---|---|---|
| Control B | PA (100) | 770 | 685 | 85 | Transparent |
| Example 5 | PA (97) PS-I (3) | 790 | 685 | 105 | Transparent |
| Example 6 | PA (97.5) PS-III (2.5) | 765 | 680 | 85 | Hazy |
| Example 7 | PA (95) PS-III (5) | 770 | 640 | 130 | Hazy |
| Example 8 | PA (90) PS-IV (10) | 775 | 645 | 130 | Hazy |

In the following Table IV the polyarylate of Control A and the blend of Example 1 were molded into ASTM test bars as described in Control A and tested for the following mechanical properties: Tensile strength and tensile modulus according to ASTM D-638; Tensile elongation to break according to ASTM D-638; Notched izod impact strength according to ASTM D-256; Tensile impact according to ASTM D-1822 and light transmission and haze according to ASTM D-1003.

The results are shown in Table IV.

TABLE IV

| | Control A | Example I |
|---|---|---|
| Tensile Strength psi (MPa) | 9,860 (68) | 9,020 (62) |
| Tensile Modulus psi (MPa) | 302,000 (2080) | 309,000 (2130) |
| Tensile Elongation to Break (%) | (70) | (73) |
| Notched Izod Impact Strength ft lbs/in (J/m) | 5 (266) | 5 (266) |
| Tensile Impact ft lbs/in$^2$ (KJ/m$^2$) | 109 (229) | 107 (225) |
| Light Transmission (percent) | (73) | (76) |
| Haze (percent) | (7.8) | (7.5) |

What is claimed is:

1. A plasticized thermoplastic polymer composition comprising in admixture, a thermoplastic polymer selected from a polyarylate derived from a dihydric phenol and at least one aromatic dicarboxylic acid, a polyetherimide, an aromatic polycarbonate, a poly(aryl ether) having a molecular weight in excess of 10,000, and mixtures thereof, and a plasticizing amount of a poly(aryl ether) having a molecular weight of from about 1000 to about 5000.

2. A composition as defined in claim 1 wherein the poly(aryl ether) having a molecular weight of from about 1000 to about 5000 comprises recurring units of the formula:

—O—E—O—E'— wherein E is the residuum of a dihydric phenol and E' is the residuum of a benzenoid compound having an inert electron withdrawing group.

3. A composition as defined in claim 2 wherein the poly(aryl ether) has recurring units having the formula:

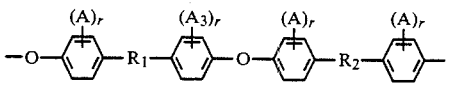

the A's are the same or different inert substituent groups and are selected from alkyl groups having from 1 to 4 carbon atoms, fluorine, chlorine, bromine, iodine, or alkoxy radicals having from 1 to 4 carbon atoms, $R_1$ represents a bond between aromatic carbon atoms or a divalent connecting radical, $R_2$ is sulfone, carbonyl or sulfoxide, the r's are integers having a value of from 0 to 4, inclusive.

4. A composition as defined in claim 3 wherein the r's are O, $R_2$ is $SO_2$, and $R_1$ is a divalent connection radical of the formula

5. A composition as defined in claim 1 wherein the dihydric phenol is of the formula:

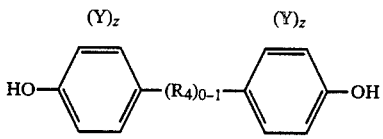

wherein Y is selected from alky groups of 1 to 4 carbon atoms, chlorine or bromine, each z, independently, has a value of from 0 to 4, inclusive, and $R_4$ is a divalent saturated or unsaturated aliphatic hydrocarbon radical selected from alkylene and alkylidene radicals having from 1 to 3 carbon atoms, and cycloalkylene or cycloalkylidene radicals having up to and including 9 carbon atoms.

6. A composition as defined in claim 5 wherein each z is O and $R_4$ is an alkylidene radical of 3 carbon atoms.

7. A composition as defined in claim 1 wherein the aromatic dicarboxylic acid is a mixture of isophthalic and terephthalic acids.

8. A composition as defined in claim 1 wherein the polyetherimides are of the following formula:

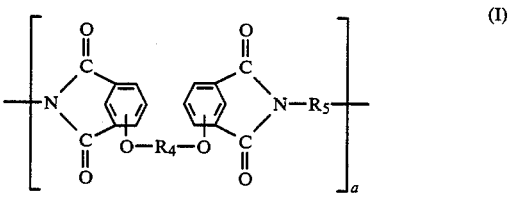

(I)

wherein a is an integer greater than 1, —O—$R_4$—O— is attached to the 3 or 4 and 3' or 4' positions and $R_4$ is selected from (a) a substituted or unsubstituted aromatic radical

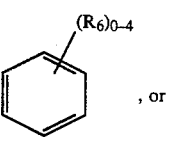

, or

-continued

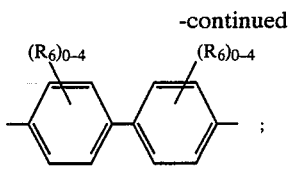

(b) a divalent radical of the formula:

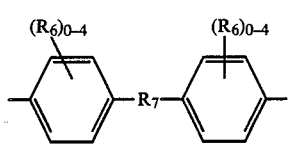

wherein $R_6$ is independently $C_1$ to $C_6$ alkyl, or halogen and $R_7$ is selected from

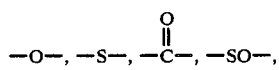

alkylene of 1 to 6 carbon atoms, cycloalkylene of 4 to 8 carbon atoms, alkylidene of 1 to 6 carbon atoms or cycloalkylidene of 4 to 8 carbon atoms, $R_3$ is selected from an aromatic hydrocarbon radical having from 6–20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms, $C_2$–$C_8$ alkylene terminated polydiorganosiloxane and a divalent radical of the formula

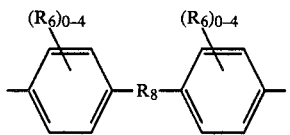

wherein $R_6$ are as previously defined, and $R_8$ is a direct bond;

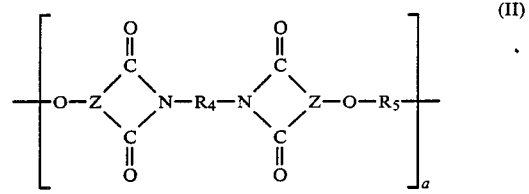

wherein —O—Z is a member selected from

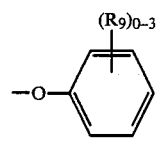

wherein $R_9$ is independently hydrogen, lower alkyl or lower alkoxy

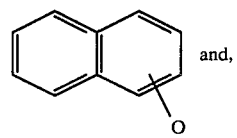

and,

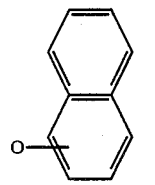

wherein the oxygen is attached to either ring and located ortho or para to one of the bonds of the imide carbonyl groups, $R_4$ and $R_5$ and a are as previously defined.

9. A composition as defined in claim 1 wherein the aromatic polycarbonate is the reaction product of a dihydric phenol and a carbonate precursor.

10. A composition as defined in claim 9 wherein the dihydric phenol is bisphenol-A.

11. A composition as defined in claims 9 or 10 wherein the carbonate precursor is carbonyl chloride.

* * * * *